United States Patent
Jo et al.

(10) Patent No.: US 12,006,991 B2
(45) Date of Patent: Jun. 11, 2024

(54) PARKING BRAKE APPARATUS

(71) Applicant: Hyundai Mobis Co., Ltd., Seoul (KR)

(72) Inventors: Chi Hoon Jo, Yongin-si (KR); Byung Su Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 952 days.

(21) Appl. No.: 17/011,687

(22) Filed: Sep. 3, 2020

(65) Prior Publication Data
US 2021/0079969 A1 Mar. 18, 2021

(30) Foreign Application Priority Data

Sep. 16, 2019 (KR) .................. 10-2019-0113386

(51) Int. Cl.
| | |
|---|---|
| *F16D 65/22* | (2006.01) |
| *F16D 65/56* | (2006.01) |
| *F16H 25/20* | (2006.01) |
| *B60T 1/06* | (2006.01) |
| *F16D 51/22* | (2006.01) |
| *F16D 121/14* | (2012.01) |
| *F16D 125/40* | (2012.01) |

(52) U.S. Cl.
CPC ........... *F16D 65/22* (2013.01); *F16D 65/561* (2013.01); *F16H 25/20* (2013.01); *B60T 1/067* (2013.01); *F16D 51/22* (2013.01); *F16D 2121/14* (2013.01); *F16D 2125/40* (2013.01); *F16H 2025/2046* (2013.01); *F16H 2025/2084* (2013.01); *F16H 2025/209* (2013.01)

(58) Field of Classification Search
CPC ... F16D 51/22; F16H 25/20; F16H 2025/2046
See application file for complete search history.

(56) References Cited

U.S. PATENT DOCUMENTS

| | | | | |
|---|---|---|---|---|
| 3,983,975 | A * | 10/1976 | Wright | F16D 65/567 |
| | | | | 188/71.9 |
| 8,091,689 | B2 * | 1/2012 | Tristano | F16D 65/18 |
| | | | | 188/72.4 |
| 2005/0252736 | A1 * | 11/2005 | Leiter | F16D 65/18 |
| | | | | 188/73.1 |
| 2011/0308898 | A1 * | 12/2011 | Shiraki | B60T 13/741 |
| | | | | 188/72.4 |
| 2017/0023079 | A1 * | 1/2017 | DeMorais | F16D 65/18 |
| 2018/0106316 | A1 * | 4/2018 | Choi | F16D 51/10 |
| 2020/0256414 | A1 * | 8/2020 | Gerber | F16D 65/38 |
| 2020/0263749 | A1 * | 8/2020 | Jo | F16D 65/561 |

FOREIGN PATENT DOCUMENTS

KR 10-2006-0134444 12/2016

* cited by examiner

*Primary Examiner* — Vishal R Sahni
(74) *Attorney, Agent, or Firm* — NSIP Law

(57) ABSTRACT

A parking brake apparatus including a bolt screw rotated by a driving force transmitted from an actuator, one or more pistons disposed at one side or both sides of the bolt screw, one or more screw nuts accommodated in the piston, screwed to an end of the bolt screw, and moved along with the rotation of the bolt screw, one or more elastic members disposed around the screw nut within the piston, and elastically deformed, in response to a displacement of the screw nut while the screw nut is moved by a set distance, to press the piston toward a shoe, and a load transfer unit disposed in the piston, and configured to transmit, to the piston, a displacement of the screw nut when the screw nut moves more than the set distance, thereby pressing the piston toward the shoe.

5 Claims, 9 Drawing Sheets

PARKING BRAKE APPARATUS

CROSS-REFERENCE TO RELATED APPLICATION

This application claims priority from and the benefit of Korean Patent Application No. 10-2019-0113386, filed on Sep. 16, 2019, which is hereby incorporated by reference for all purposes as if set forth herein.

BACKGROUND

Field

Exemplary embodiments of the present disclosure relate to a parking brake apparatus, and more particularly, to a parking brake apparatus that generates a braking force by driving an actuator.

Discussion of the Background

In general, an electronic parking brake (EPB) is a device that generates a braking force to restrain the rotation of wheels with the driving force of an actuator. When the actuator is driven to rotate a worm shaft, a piston moves while a worm wheel engaged with the worm shaft is rotated, thereby generating or releasing a braking force.

A screw nut is installed inside the piston. Between the screw nut and the piston, an elastic member is installed to prevent a gap from occurring, namely to compensate for a stroke loss, between the piston and a shoe due to the rotation of the shoe when a brake pedal is released. The elastic member is able to compensate for a stroke loss by elastically pressing the piston toward the brake shoe.

In order to overcome the critical problem of failing to generate the braking force required for a target load if the elastic member is damaged, and also to stably generate a braking force corresponding to the increase in weight of a large vehicle, efforts have been made to increase the service life of the elastic member. However, the elastic member has a limit in expanding in size since multiple braking parts are placed in an in-wheel limited space. Therefore, it is necessary to improve these problems.

The related art of the present disclosure is disclosed in Korean Patent Application Publication No. 2006-0134444 (published on Dec. 28, 2006, entitled "Parking Brake Apparatus with Disc Brake").

SUMMARY

Various embodiments are directed to a parking brake apparatus capable of further increasing a service life of an elastic member that elastically presses a piston to a shoe.

In an embodiment, there is provided a parking brake apparatus that includes a bolt screw rotated by a driving force transmitted from an actuator, one or more pistons disposed at one side or both sides of the bolt screw, one or more screw nuts accommodated in the piston, screwed to an end of the bolt screw, and moved along with the rotation of the bolt screw, one or more elastic members disposed around the screw nut within the piston, and elastically deformed, in response to a displacement of the screw nut while the screw nut is moved by a set distance, to press the piston toward a shoe, and a load transfer unit disposed in the piston, and configured to transmit, to the piston, a displacement of the screw nut when the screw nut moves more than the set distance, thereby pressing the piston toward the shoe.

The load transfer unit may include a nut protrusion pressing part protruding from an end of the screw nut and axially facing the piston with the set distance therebetween.

The screw nut may include a nut body around which the elastic member is fitted, a bolt fastening part having a female thread thereon and formed on an inner diameter portion of the nut body, the bolt screw being screwed to the blot fastening part, a pressure ring fastening part formed at one end of the nut body, a spring pressing part, which is in axial contact with the elastic member, being coupled to the pressure ring fastening part, and a rotation restraining part having a polygonal cross-sectional shape and formed at the other end of the nut body, the rotation restraining part being inserted into a rotation restraining groove formed in the piston, the nut protrusion pressing part being formed on the rotation restraining part.

The nut protrusion pressing part may have a smaller width than the rotation restraining part, and be radially spaced apart from an inner diameter portion of the piston with a distance therebetween.

The nut protrusion pressing part may have a ring shape with an inner diameter portion which is continuous with the nut body.

The piston may include a piston body having a receiving space in which the screw nut and the elastic member are accommodated, a stopper installation part recessed radially from an inner diameter portion of the piston body, a stopper being installed in the stopper installation part to restrain the elastic member from escaping out of the piston body, and a rotation restraining groove recessed axially from an end of the receiving space, a polygonal end of the screw nut being slidably installed in the rotation restraining groove, the rotation restraining groove being in contact with the nut protrusion pressing part when the screw nut is moved by the set distance.

The stopper may include an elastic member support ring having a polygonal inner surface and outer surface, installed in the rotation restraining groove while protruding inwardly, and configured to support the elastic member, and a fixing ring installed in the rotation restraining groove together with the elastic member support ring, and configured to restrain movement of the elastic member support ring.

The load transfer unit may include an additional elastic member disposed with a gap corresponding to the set distance between an end of the screw nut and the piston.

The additional elastic member may have a greater modulus of elasticity than the elastic member.

The screw nut may include a nut body around which the elastic member is fitted, a bolt fastening part having a female thread thereon and formed on an inner diameter portion of the nut body, the bolt screw being screwed to the blot fastening part, a pressure ring fastening part formed at one end of the nut body, a spring pressing part, which is in axial contact with the elastic member, being coupled to the pressure ring fastening part, and a rotation restraining part having a polygonal cross-sectional shape and formed at the other end of the nut body, the rotation restraining part being inserted into a rotation restraining groove formed in the piston, the rotation restraining part being in close contact with the additional elastic member when the nut body is moved by the set distance.

The piston may include a piston body having a receiving space in which the screw nut and the elastic member are accommodated, a stopper installation part recessed radially from an inner diameter portion of the piston body, a stopper being installed in the stopper installation part to restrain the elastic member from escaping out of the piston body, and a rotation restraining groove recessed axially from an end of the receiving space, a polygonal end of the screw nut being slidably installed in the rotation restraining groove, the additional elastic member being accommodated with a gap corresponding to the set distance in the rotation restraining groove.

The load transfer unit may include a laminated elastic member disposed around the screw nut within the piston and disposed in series with the elastic member.

The laminated elastic member may have a greater modulus of elasticity than the elastic member.

The screw nut may include a nut body around which the elastic member and the laminated elastic member are fitted, a bolt fastening part having a female thread thereon and formed on an inner diameter portion of the nut body, the bolt screw being screwed to the blot fastening part, a pressure ring fastening part formed at one end of the nut body, a spring pressing part, which is in axial contact with the elastic member, being coupled to the pressure ring fastening part, and a rotation restraining part having a polygonal cross-sectional shape and formed at the other end of the nut body, the rotation restraining part being inserted into a rotation restraining groove formed in the piston.

The piston may include a piston body having a receiving space in which the screw nut, the elastic member, and the laminated elastic member are accommodated, a stopper installation part recessed radially from an inner diameter portion of the piston body, a stopper being installed in the stopper installation part to restrain the elastic member from escaping out of the piston body, and a rotation restraining groove recessed axially from an end of the receiving space, a polygonal end of the screw nut being slidably installed in the rotation restraining groove.

The receiving space may include a reduced diameter portion having a first diameter and formed to be continuous with the rotation restraining groove, a portion of the elastic member being accommodated in the reduced diameter portion, and an enlarged diameter portion having a second diameter larger than the first diameter and formed to be continuous with the reduced diameter portion, the laminated elastic member having a width larger than the first diameter and the other portion of the elastic member protruding by the set distance from the reduced diameter portion being accommodated in the enlarged diameter portion.

As apparent from the above description, the parking brake apparatus of the present disclosure implements the following operation. The load transfer unit is kept spaced apart from the piston in an axial direction or with a gap therebetween while the screw nut is moved by the set distance. When the screw nut is moved by the set distance, the load transfer unit is in axial contact with the piston. Thereafter, the displacement of the screw nut, when the screw nut moves more than the set distance, is transmitted to the piston through the load transfer unit.

Accordingly, according to the present disclosure, after the screw nut is moved by the set distance, namely, after the load transfer unit is in axial contact with the piston, the additional displacement of the screw nut, when the screw nut is further moved, is not transmitted to the elastic member or is distributed and transmitted to the elastic member and the load transfer unit. Therefore, the present disclosure can further reduce the load applied to the elastic member, compared to an example in which the load is transmitted to the piston via only the elastic member throughout the distance of movement of the screw nut. Thus, it is possible to further increase the service life of the elastic member.

DETAILED DESCRIPTION OF THE ILLUSTRATED EMBODIMENTS

Hereinafter, a parking brake apparatus will be described below with reference to the accompanying drawings through various exemplary embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosure set forth herein.

Figure 1:
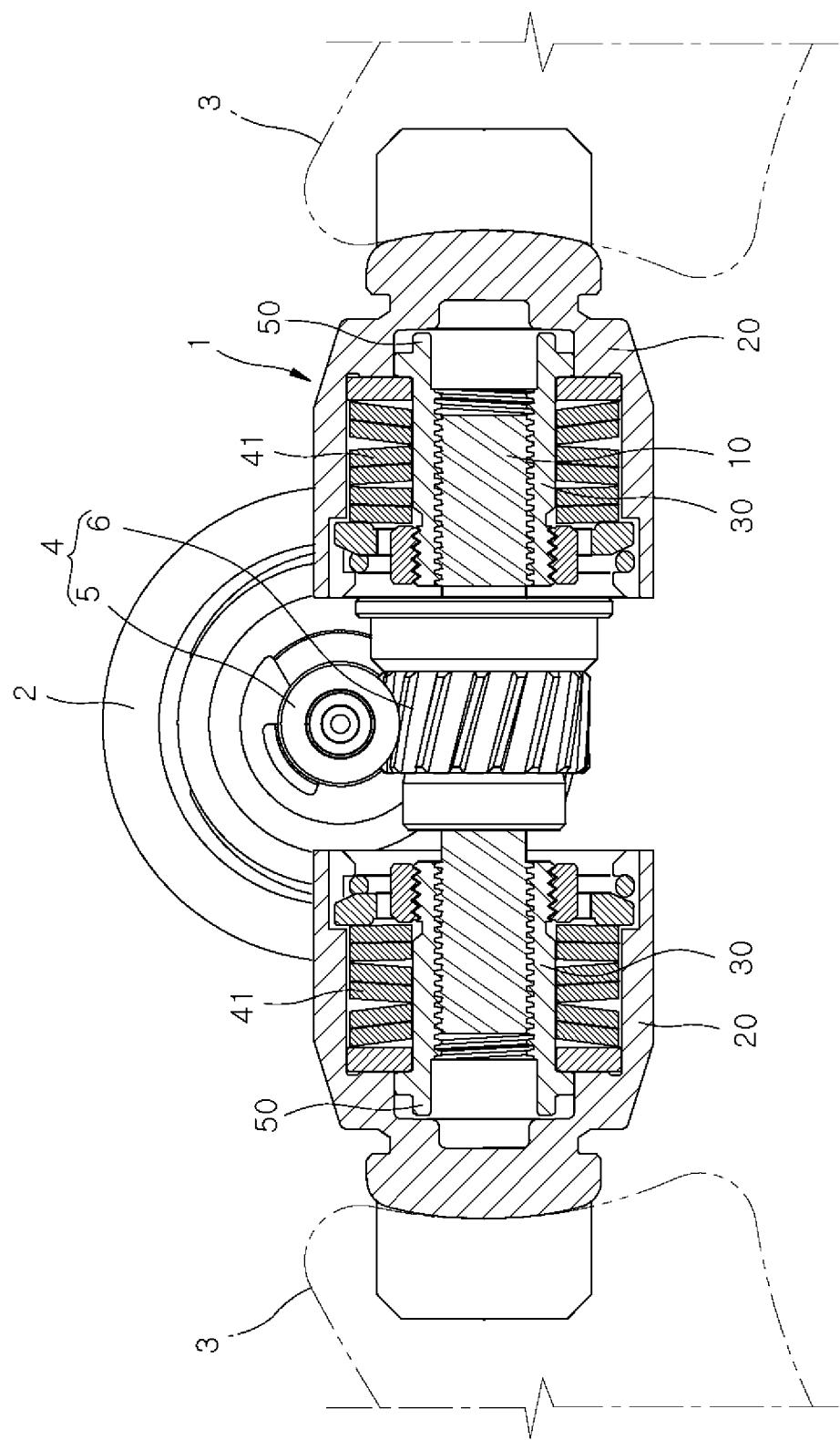
FIG. 1 is a cross-sectional view schematically illustrating an installation state of main parts of a parking brake apparatus according to a first embodiment of the present disclosure.
Figure 2:
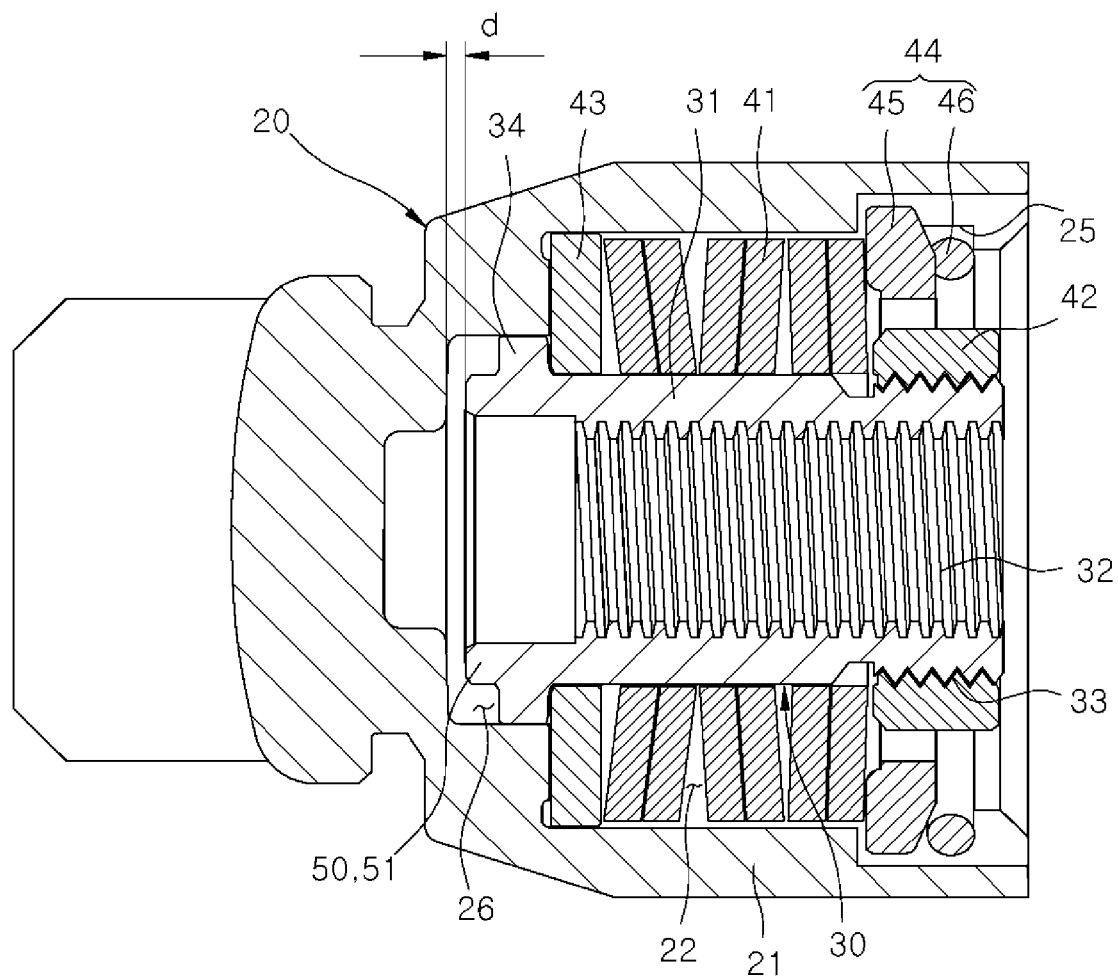
FIG. 2 is a cross-sectional view schematically illustrating the main parts of the parking brake apparatus according to the first embodiment of the present disclosure.
Figure 3:
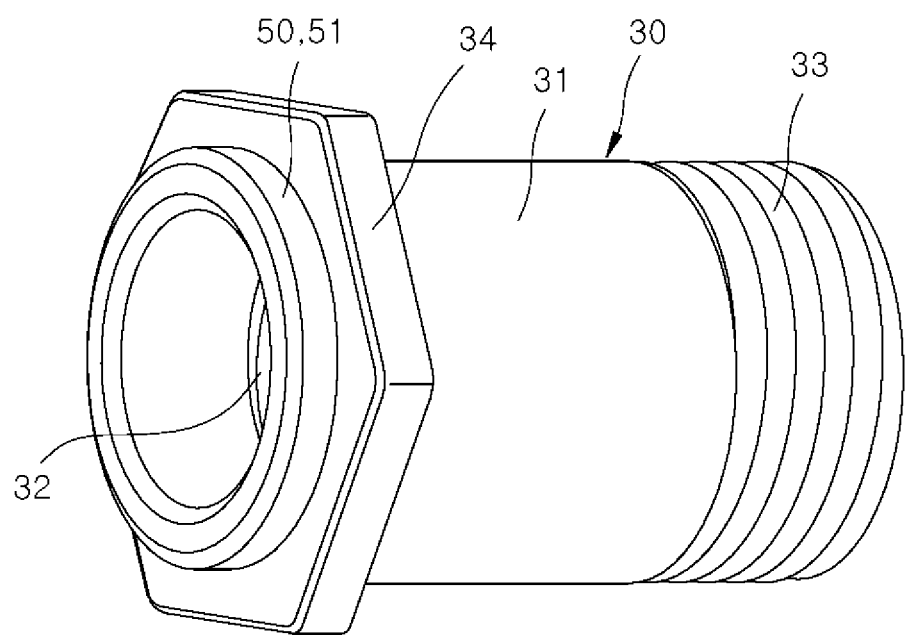
FIG. 3 is a perspective view schematically illustrating one screw nut of the parking brake apparatus according to the first embodiment of the present disclosure.

FIG. 1 is a cross-sectional view schematically illustrating an installation state of main parts of a parking brake apparatus according to a first embodiment of the present disclosure. FIG. 2 is a cross-sectional view schematically illustrating the main parts of the parking brake apparatus according to the first embodiment of the present disclosure. FIG. 3 is a perspective view schematically illustrating one screw nut of the parking brake apparatus according to the first embodiment of the present disclosure.

Referring to FIGS. 1 and 2, the parking brake apparatus, which is designated by reference numeral 1, according to the first embodiment of the present disclosure includes a bolt screw 10, pistons 20, screw nuts 30, elastic members 41, and load transfer units 50.

The bolt screw 10 is installed to extend from side to side about an actuator 2. The bolt screw 10 has male threads formed at both ends thereof. The bolt screw 10 is rotated by the driving force transmitted from the actuator 2. The actuator 2 may use a motor, and the motor may transmit a rotational force to the bolt screw 10 via a gear member 4.

The gear member 4 may use a worm shaft 5 and a worm wheel 6. The worm shaft 5 is coupled to the output shaft of the motor. The worm wheel 6 is coupled around the bolt screw 10 and engages with the worm shaft 5. The rotational force of the motor is transmitted from the output shaft via the worm shaft 5 and the worm wheel 6 to the bolt screw 10.

The pistons 20 each have a structure capable of accommodating an associated one of the screw nuts 30, an associated one of the elastic members 41, and an associated one of the load transfer units 50 therein, and are disposed on both left and right sides of the bolt screw 10, respectively. The screw nuts 30 are accommodated in the respective pistons 20, are screwed to both left and right ends of the bolt screw 10, respectively, and are moved linearly in the left and right directions along with the rotation of the bolt screw 10.

When the bolt screw 10 is rotated in a forward direction, the pair of left and right screw nuts 30 are moved away from each other, so that the pair of left and right pistons 20 are moved away from each other. The movement of the pistons 20 allows a pair of left and right shoes 3 to be pushed away from each other, so that the shoes 3 perform braking on a wheel (not shown) to stop the rotation of the wheel while coming into frictional contact with a wheel disk (not shown). When the bolt screw 10 is rotated in a reverse direction, the pair of screw nuts 30 are moved close to each other, so that the shoes 3 are returned to their initial positions, namely moved close to each other, to release the braking of the wheel.

Each of the elastic members 41 is an element for elastically transmitting the displacement of the associated screw nut 30 to the associated piston 20, and is disposed around the screw nut 30 within the piston 20. The elastic member 41 according to the embodiment of the present disclosure has a structure in which multiple disc springs are laminated. A flat ring-shaped ring plate 43 is disposed between the elastic member 41 and the piston 20. Accordingly, the pressing force of the elastic member 41 may be uniformly distributed and transmitted to the piston 20 via the ring plate 43.

The elastic member 41 is elastically deformed in response to the displacement of the screw nut 30 while the screw nut 30 is moved by a set distance d, to press the piston 20 toward an associated one of the shoes 3. Each of the load transfer units 50 may alone transmit, to the associated piston 20, the displacement of the associated screw nut 30 when the screw nut 30 moves more than a set distance d.

As the displacement of the screw nut 30 while the screw nut 30 is moved by the set distance d is transmitted to the piston 20 via the elastic member 41, the same load is increasingly applied to the screw nut 30 and the elastic member 41. In this case, the piston 20 presses the shoe 3 with a force corresponding to the load applied to the screw nut 30 and the elastic member 41.

In the description herein, the load applied to the screw nut 30, the elastic member 41, and the piston 20 in the state in which the screw nut 30 is moved by the set distance d is referred to as a "reference load".

The load transfer unit 50 is kept spaced apart from the piston 20 in an axial direction (in a horizontal direction in FIGS. 1 and 2) or with a gap therebetween while the screw nut 30 is moved by the set distance d. When the screw nut 30 then reaches the set distance d, the load transfer unit 50 comes into axial contact with the piston 20. Thereafter, the displacement of the screw nut 30, when the screw nut 30 moves more than the set distance d, is transmitted to the piston 20 through the load transfer unit 50.

After the load transfer unit 50 is in axial contact with the piston 20, the additional displacement of the screw nut 30 when the screw nut 30 is further moved is not transmitted to the elastic member 41.

Therefore, the present disclosure can further reduce the load applied to the elastic member 41, compared to an example in which the load is transmitted to the piston 20 via only the elastic member 41 throughout the distance of movement of the screw nut 30 in excess of the set distance d. Thus, it is possible to further increase the service life of the elastic member 41.

Referring to FIGS. 2 and 3, the load transfer unit 50 according to the first embodiment of the present disclosure includes a nut protrusion pressing part 51. The nut protrusion pressing part 51 protrudes from the end of the screw nut 30 that axially faces the piston 20, and axially faces the piston 20 with the set distance d therebetween. The nut protrusion pressing part 51 is formed to protrude from the end of the screw nut 30 in a direction to press the piston 20.

Figure 4:
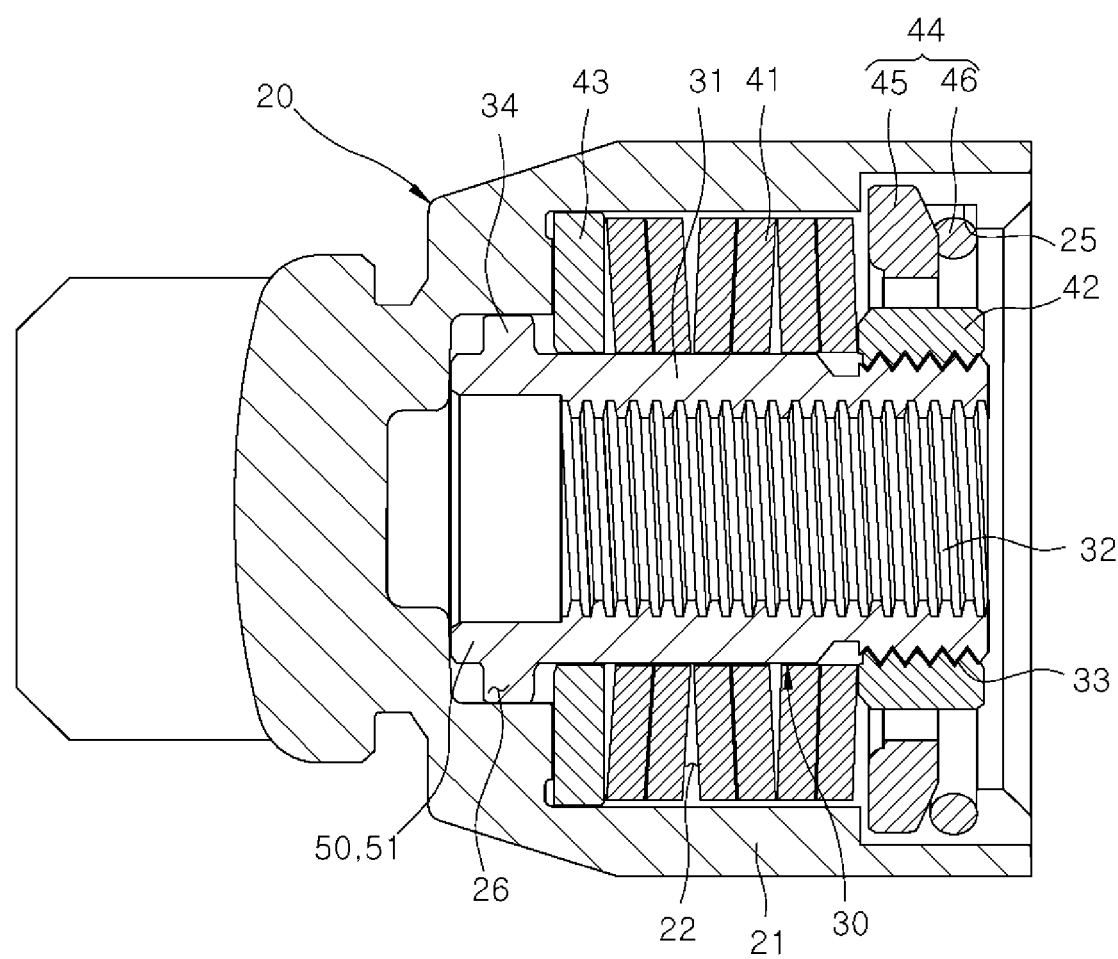
FIG. 4 is a view for explaining a state of operation of the parking brake apparatus according to the first embodiment of the present disclosure.
Figure 5:
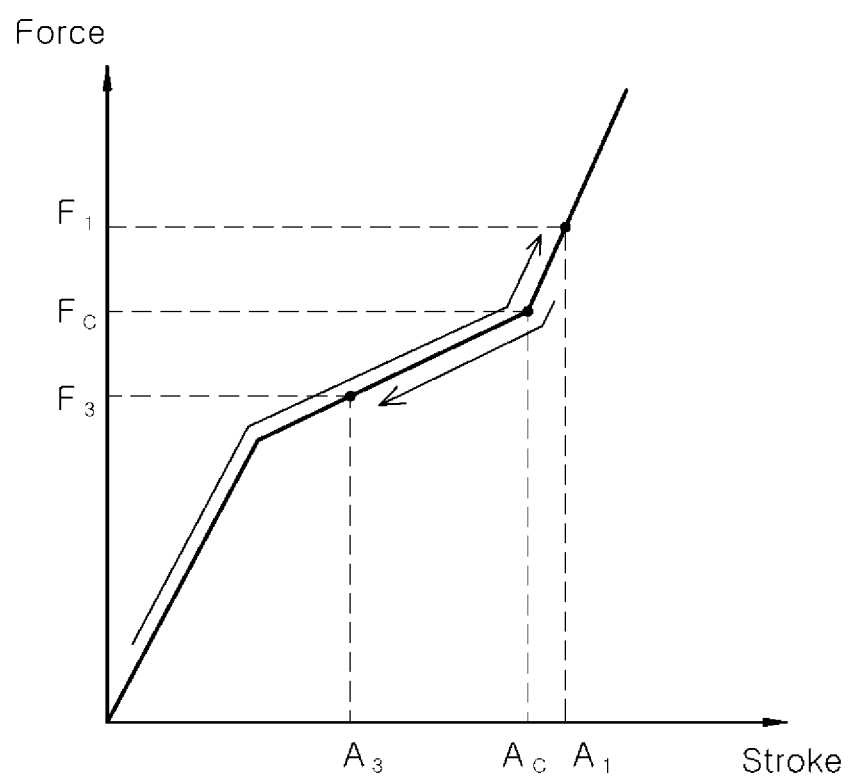
FIG. 5 is a graph illustrating a change in braking force according to the operation of the parking brake apparatus according to the first embodiment of the present disclosure.

FIG. 4 is a view for explaining a state of operation of the parking brake apparatus according to the first embodiment of the present disclosure. FIG. 5 is a graph illustrating a change in braking force according to the operation of the parking brake apparatus according to the first embodiment of the present disclosure.

Referring to FIGS. 2 and 4, the piston 20 according to the first embodiment of the present disclosure includes a piston body 21, a stopper installation part 25, and a rotation restraining groove 26.

The piston body 21 is an element that forms a basic frame of the piston 20, and has therein a receiving space 22 in which the screw nut 30 and the elastic member 41 are accommodated. The stopper installation part 25 is an element in which a stopper 44 is installed to support the elastic member 41, and is recessed radially from the inner diameter portion of the piston body 21.

The stopper 44 is an element for restraining the elastic member 41 from escaping out of the piston body 21, and protrudes inwardly toward the receiving space 22 from the open end of the piston body 21. The stopper 44 according to the first embodiment of the present disclosure includes an elastic member support ring 45 and a fixing ring 46.

The elastic member support ring 45 has a polygonal inner surface and outer surface and is installed in the stopper installation part 25 while protruding inwardly. The elastic member support ring 45 has the polygonal outer surface, and is fitted into the stopper installation part 25 to be fixedly coupled to the piston body 21, so that the arbitrary rotation of the elastic member support ring 45 is restrained.

The elastic member support ring 45 has the polygonal inner surface, and is disposed on the radially outer side of a spring pressing part 42, thereby restraining the rotation of the spring pressing part 42. The radially inner side of the elastic member support ring 45, which protrudes toward the receiving space 22, is in axial contact with the elastic member 41. The elastic member 41 is latched by the elastic member support ring 45 and is restrained from escaping out of the piston body 21.

The fixing ring 46 is installed in the stopper installation part 25 together with the elastic member support ring 45, and restrains the movement of the elastic member support ring 45. The fixing ring 46 may use a C-ring having a C-shaped curved structure. The fixing ring 46 may be installed in such a manner that, after the elastic member support ring 45 is fitted into the stopper installation part 25 through the open end of the piston body 21, the fixing ring 46 is placed within the stopper installation part 25 through the open end of the piston body 21, in a state in which the fixing ring 46 is pressed to be further reduced in diameter, and the pressing force of the fixing ring 46 is then released.

The rotation restraining groove 26 is an element for restraining the rotation of the screw nut 30, and is recessed axially from the end of the receiving space 22. The rotation restraining groove 26 has a polygonal cross-sectional shape corresponding to a rotation restraining part 34. The rotation restraining part 34 of the screw nut 30 having a polygonal cross-sectional shape is slidably installed in the rotation restraining groove 26, and the nut protrusion pressing part 51 is inserted into the rotation restraining groove 26. When the screw nut 30 is moved by the set distance d, the nut protrusion pressing part 51 comes into axial contact with the end of the rotation restraining groove 26, as illustrated in FIG. 4.

Referring to FIGS. 2 and 4, the screw nut 30 according to the first embodiment of the present disclosure includes a nut body 31, a bolt fastening part 32, a pressure ring fastening part 33, and a rotation restraining part 34.

The nut body 31 is an element that forms a basic frame of the screw nut 30, and the elastic member 41 having a disc spring structure is fitted around the nut body 31. The bolt fastening part 32 has a female thread thereon and is formed on the inner diameter portion of the nut body 31. The end of the bolt screw 10 having a male thread thereon is fastened to the blot fastening part 32.

The pressure ring fastening part 33 is an element to which the spring pressing part 42, which transmits the displacement of the nut body 31 to the elastic member 41, is coupled. The pressure ring fastening part 33 has a male thread thereon and is formed on the outer diameter portion of the nut body 31. The pressure ring fastening part 33 is fastened to the inner diameter portion of the spring pressing part 42 having a female thread thereon, thereby enabling the spring pressing part 42 to be fixedly coupled to the screw nut 30.

The spring pressing part 42 has a ring shape, and protrudes radially and is coupled around the screw nut 30. The spring pressing part 42 is in axial contact with the inner diameter portion of the elastic member 41. The spring pressing part 42 axially presses the elastic member 41 while moving at the same displacement as the screw nut 30. The spring pressing part 42 has a polygonal outer surface, and is disposed coaxially with the elastic member support ring 45 having a polygonal inner surface, so that the rotation of the spring pressing part 42 is restrained.

The rotation restraining part 34 has a polygonal cross-sectional shape and is formed at the end of the nut body 31 that axially faces the inner surface of the piston 20. The rotation restraining part 34 is inserted into the rotation restraining groove 26. The nut protrusion pressing part 51 axially protrudes from the rotation restraining part 34. In the initial state illustrated in FIG. 2, the nut protrusion pressing part 51 has an axial end spaced apart from the piston 20 with the set distance d therebetween.

The nut protrusion pressing part 51 has a smaller width than the rotation restraining part 34, and is radially spaced apart from the inner diameter portion of the piston 20 with a distance therebetween. Accordingly, in the state in which the screw nut 30 is moved by the set distance d as illustrated in FIG. 4, it is possible to prevent the screw nut 30 from interfering with the inner diameter portion of the piston 20, more specifically, the edge and corner of the rotation restraining groove 26.

The nut protrusion pressing part 51 has a ring shape with an inner diameter portion which is continuous with the nut body 31. The ring shape of the nut protrusion pressing part 51 allows the nut protrusion pressing part 51 to transmit a non-biased, namely, uniform pressing force to the piston 20 on the central axis of the nut protrusion pressing part 51. In addition, the nut protrusion pressing part 51 may be formed integrally, without the need to add a separate process, in the process of manufacturing the screw nut 30, more specifically, in the process of forming the nut body 31 or forming the bolt fastening part 32 on the inner diameter portion of the nut body 31.

Referring to FIG. 5, before the screw nut 30 moves the set distance d (to point Ac in FIG. 5), the same load is increasingly applied to the screw nut 30 and the elastic member 41 and is transferred to the piston 20. When the screw nut 30 has been moved by the set distance d, a reference load Fc is applied to the elastic member 41 and the piston 20 presses the shoe 3 with the reference load Fc.

After the nut protrusion pressing part 51 and the piston 20 are in contact with each other, namely after the point Ac, the nut protrusion pressing part 51 directly transfers the load to the piston 20. Accordingly, even if the screw nut 30 continues to move by the forward rotation of the bolt screw 10, the load applied to the elastic member 41 does not increase any more, and is maintained as the reference load Fc. The load applied to the piston 20 and the shoe 3, namely, the contact force between the piston 20 and the shoe 3 reaches a target load $F_1$ beyond the reference load Fc by the above-mentioned action (see the upward movement arrow in FIG. 5).

In the state in which the wheel is braked with the load corresponding to the target load $F_1$, when a driver releases a brake pedal, especially when the driver releases the brake pedal on the slope, a stroke loss occurs between the shoe 3 and the piston 20 due to the behavior of the shoe 3, thereby reducing the contact force between the piston 20 and the shoe to $F_3$ (see the downward movement arrow in FIG. 5). According to the first embodiment of the present disclosure, the pressing force as the load corresponding to $F_3$ is finally applied to the shoe 3 by the above-mentioned action.

Figure 6:
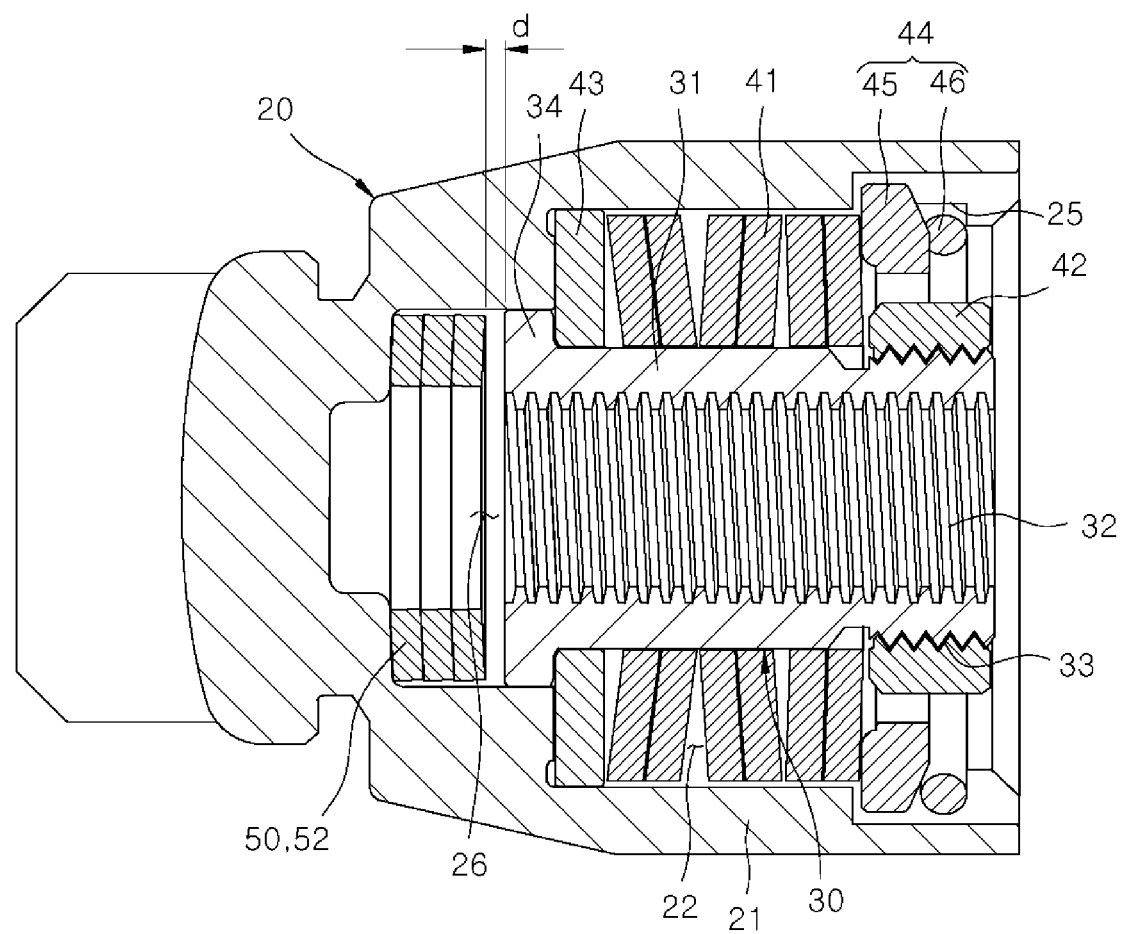
FIG. 6 is a cross-sectional view schematically illustrating main parts of a parking brake apparatus according to a second embodiment of the present disclosure.
Figure 7:
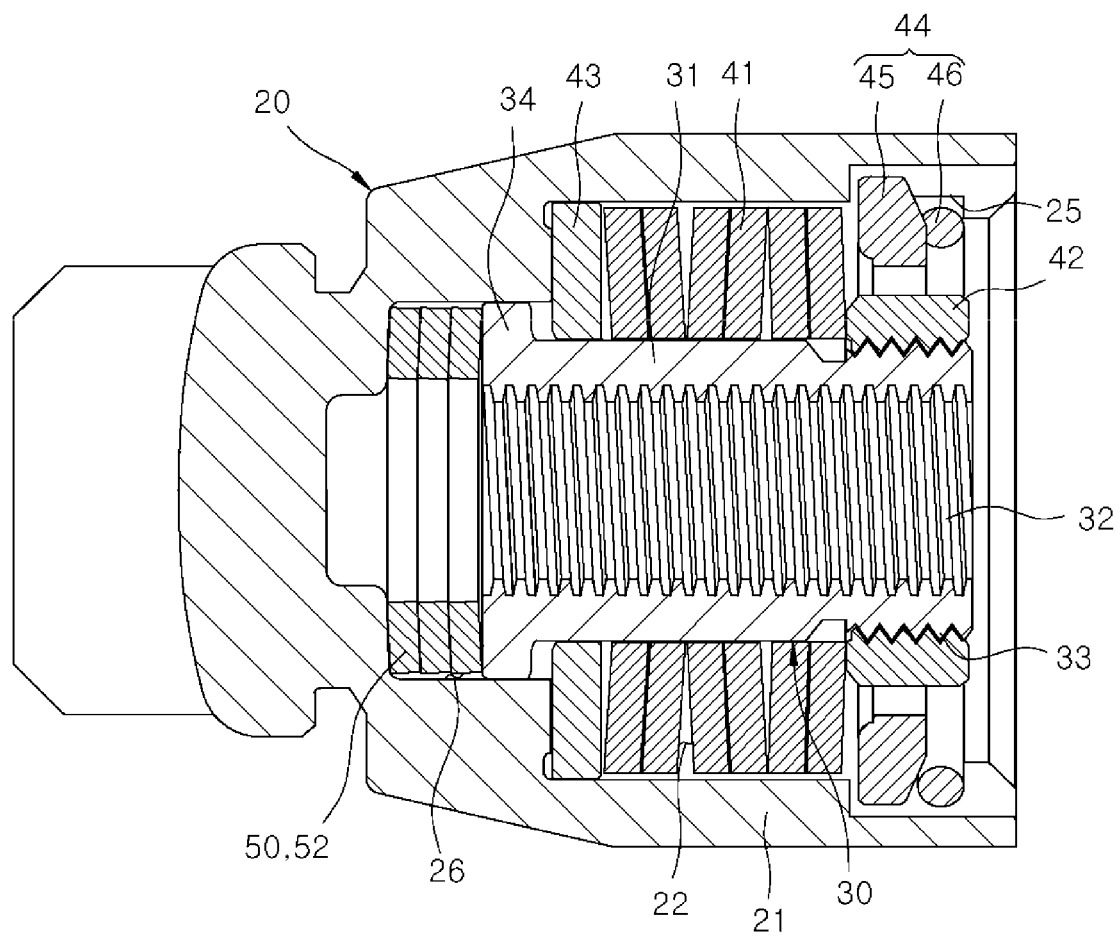
FIG. 7 is a view for explaining a state of operation of the parking brake apparatus according to the second embodiment of the present disclosure.

FIG. 6 is a cross-sectional view schematically illustrating main parts of a parking brake apparatus according to a second embodiment of the present disclosure. FIG. 7 is a view for explaining a state of operation of the parking brake apparatus according to the second embodiment of the present disclosure.

Next, the parking brake apparatus, which is designated by reference numeral 1, according to the second embodiment of the present disclosure will be described with reference to FIGS. 6 and 7. In the parking brake apparatus 1 according to the second embodiment of the present disclosure, a description of the configuration identical, similar, or corresponding to the parking brake apparatus 1 according to the first embodiment of the present disclosure will be omitted.

A load transfer unit 50 according to the second embodiment of the present disclosure includes an additional elastic member 52, as compared with the load transfer unit 50 according to the first embodiment of the present disclosure.

The additional elastic member 52 is disposed with a gap corresponding to the set distance d between the axial end of a screw nut 30 and a piston 20. The additional elastic member 52 according to the second embodiment of the present disclosure may be formed by laminating a plurality of disc springs, and may have various moduli of elasticity suitable for the characteristics and thickness of material.

The additional elastic member 52 has a greater modulus of elasticity than the elastic member 41. As the additional elastic member 52 has the greater modulus of elasticity than the elastic member 41, the load exceeding the reference load Fc (see FIG. 5) may be stably transferred to the piston 20 through the additional elastic member 52.

Similar to the screw nut 30 of the parking brake apparatus 1 according to the first embodiment of the present disclosure, the screw nut 30 according to the second embodiment of the present disclosure includes the nut body 31, the bolt fastening part 32, the pressure ring fastening part 33, and the rotation restraining part 34, and has a structure in which, when the nut body 31 is moved by the set distance d, the rotation restraining part 34 is in close contact with the additional elastic member 52. Here, "close contact" means that there is no gap.

Similar to the piston 20 of the parking brake apparatus 1 according to the first embodiment of the present disclosure, the piston 20 according to the second embodiment of the present disclosure includes the piston body 21, the stopper installation part 25, and the rotation restraining groove 26, and has a structure in which the additional elastic member 52 is accommodated in the rotation restraining groove 26 with a gap corresponding to the set distance d therebetween. That is, the rotation restraining groove 26 has an axial length equal to the sum of the axial widths of the rotation restraining part 34, the set distance d, and the additional elastic member 52.

When the screw nut 30 is moved by the set distance d, the additional elastic member 52 is in close contact with the axial end of the rotation restraining groove 26. In other words, both axial ends of the additional elastic member 52 are in contact with the axial ends of the rotation restraining part 34 and the rotation restraining groove 26, respectively. Thereafter, the load according to the displacement of the screw nut 30, when the screw nut 30 moves more than the set distance d, is applied to both of the elastic member 41 and the additional elastic member 52 by the spring pressing part 42 and the rotation restraining part 34.

The additional elastic member 52 has the greater modulus of elasticity than the elastic member 41. Accordingly, after the screw nut 30 is moved by the set distance d, the additional elastic member 52 mainly transmits a pressing force to the piston 20 by the additional elastic member 52. In this case, the amount of deformation of the elastic member 41 is clearly reduced compared to that until the screw nut 30 is moved by the distance d, more specifically, the elastic member 41 is elastically deformed by the same amount of deformation as the additional elastic member 52.

That is, when the screw nut 30 moves more than the set distance d, the load transfer unit 50 presses the piston 20 together with the elastic member 41 toward the shoe 3. The displacement of the screw nut 30, while the screw nut 30 moves more than the set distance d, is distributed and transmitted to both of the elastic member 41 and the load transfer unit 50, so that the elastic member 41 and the load transfer unit 50 press the piston 20.

Figure 8:
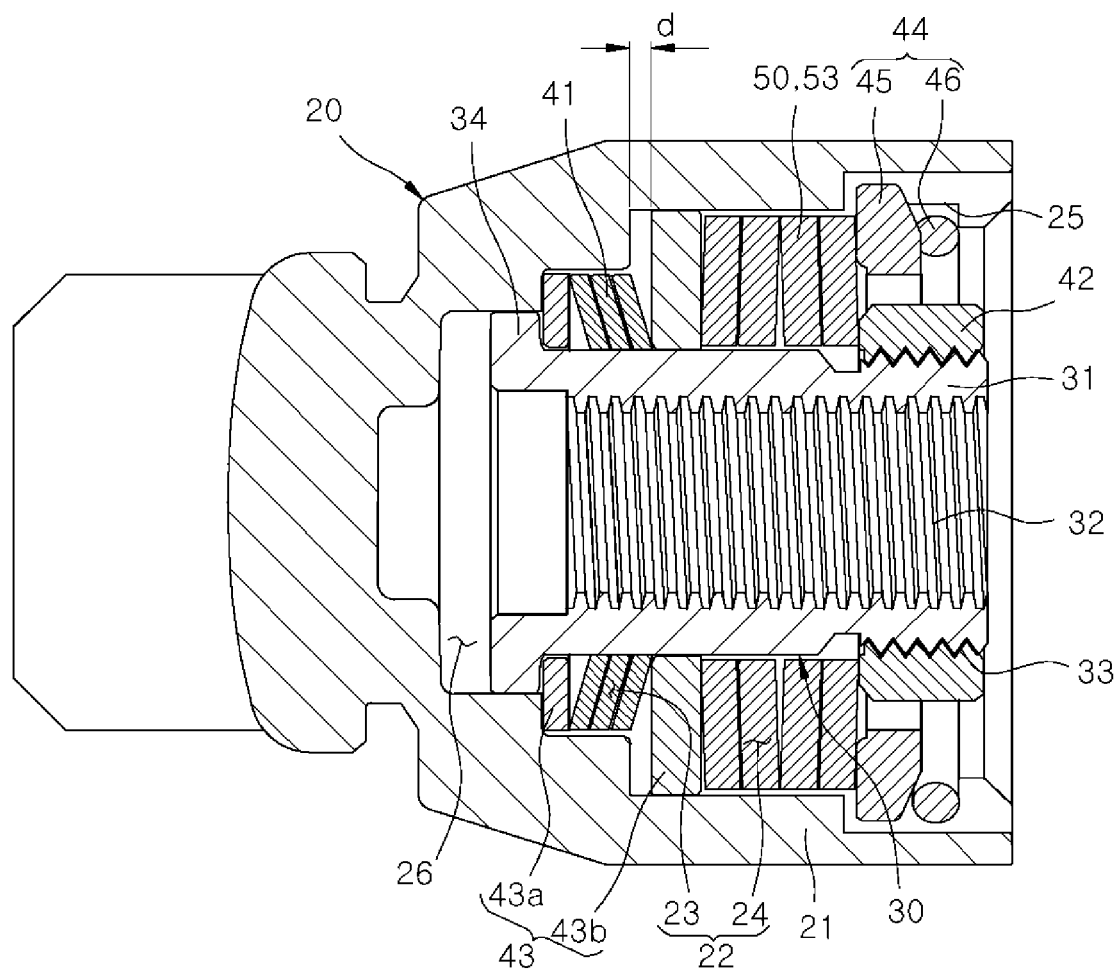
FIG. 8 is a cross-sectional view schematically illustrating main parts of a parking brake apparatus according to a third embodiment of the present disclosure.
Figure 9:
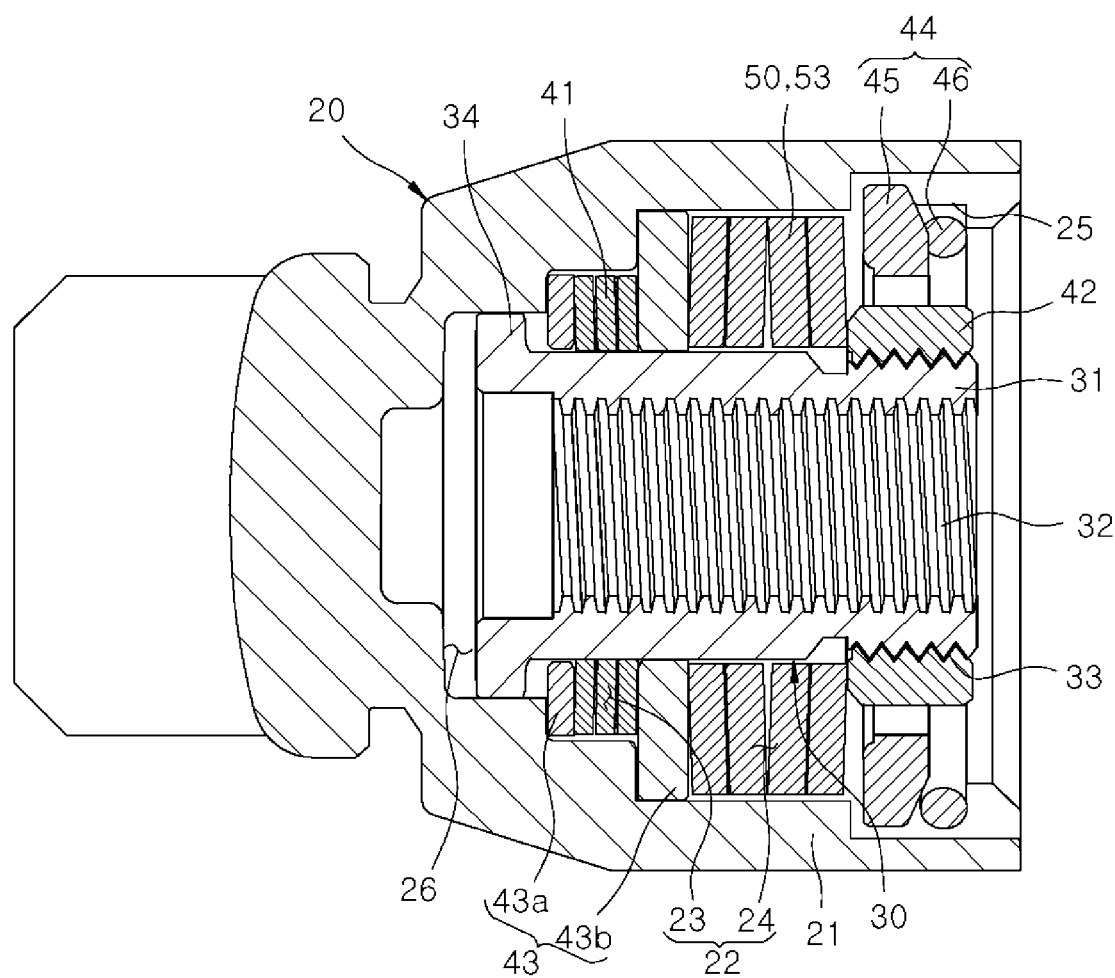
FIG. 9 is a view for explaining a state of operation of the parking brake apparatus according to the third embodiment of the present disclosure.

FIG. 8 is a cross-sectional view schematically illustrating main parts of a parking brake apparatus according to a third embodiment of the present disclosure. FIG. 9 is a view for explaining a state of operation of the parking brake apparatus according to the third embodiment of the present disclosure.

Next, the parking brake apparatus, which is designated by reference numeral 1, according to the third embodiment of the present disclosure will be described with reference to FIGS. 8 and 9. In the parking brake apparatus 1 according to the third embodiment of the present disclosure, a description of the configuration identical, similar, or corresponding to the parking brake apparatus 1 according to the first and second embodiments of the present disclosure will be omitted.

A load transfer unit 50 according to the third embodiment of the present disclosure includes a laminated elastic member 53, as compared with the load transfer unit 50 according to the second embodiment of the present disclosure.

The laminated elastic member 53 is disposed around a screw nut 30 in a piston 20, and is disposed in series with the elastic member 41. The laminated elastic member 53 according to the third embodiment of the present disclosure has an extended width (diameter) compared to the elastic member 41, and is axially continuous with the elastic member 41. The laminated elastic member 53 according to the third embodiment of the present disclosure may be formed by laminating a plurality of disc springs, and may have various moduli of elasticity suitable for the characteristics and thickness of material.

The laminated elastic member 53 has a greater modulus of elasticity than the elastic member 41. As the laminated elastic member 53 has the greater modulus of elasticity than the elastic member 41, the load exceeding the reference load Fc (see FIG. 5) may be stably transferred to the piston 20 through the laminated elastic member 53.

Similar to the screw nut 30 of the parking brake apparatus 1 according to the first and second embodiments of the present disclosure, the screw nut 30 according to the third embodiment of the present disclosure includes the nut body 31, the bolt fastening part 32, the pressure ring fastening part 33, and the rotation restraining part 34, and has a structure in which the elastic member 41 and the laminated elastic member 53 are able to be fitted in series around the nut body 31. That is, the nut body 31 has a further extended length corresponding to the axial width of the laminated elastic member 53, compared to that of the second embodiment.

Similar to the piston 20 of the parking brake apparatus 1 according to the first and second embodiments of the present disclosure, the piston 20 according to the third embodiment of the present disclosure includes the piston body 21, the stopper installation part 25, and the rotation restraining groove 26, and has a structure in which the piston body 21 is able to accommodate in series the elastic members 41 and the laminated elastic members 53 with different diameters. The receiving space 22 of the piston body 21 according to the third embodiment of the present disclosure is provided with a reduced diameter portion 23 and an enlarged diameter portion 24.

The reduced diameter portion 23 is a space in which the elastic member 41 is accommodated, has a first diameter larger than that of the rotation restraining groove 26, and is axially continuous with the rotation restraining groove 26. The elastic member 41 has a diameter smaller than the first diameter, and is accommodated in the reduced diameter portion 23. The laminated elastic member 53 has a diameter larger than the first diameter.

The enlarged diameter portion 24 is a space in which the laminated elastic member 53 is accommodated, has a second diameter larger than the first diameter, and is axially continuous with the reduced diameter portion 23. The piston 20 according to the third embodiment of the present disclosure has a structure in which, from the axial inner end thereof toward the open end thereof, the rotation restraining groove 26, the reduced diameter portion 23, the enlarged diameter portion 24, and the stopper installation part 25 axially and continuously communicate with each other while gradually enlarged in inner diameter. The laminated elastic member 53 has a diameter larger than the first diameter and smaller than the second diameter, and is accommodated in the enlarged diameter portion 24.

A flat ring-shaped first ring plate 43a is disposed between the axial end of the reduced diameter portion 23 and the elastic member 41, so that the pressing force of the elastic member 41 is uniformly distributed and transmitted to the axial end of the reduced diameter portion 23 via the first ring plate 43a. A flat ring-shaped second ring plate 43b is disposed between the axial end of the enlarged diameter portion 24 and the laminated elastic member 53, so that the pressing force of the laminated elastic member 53 is uniformly distributed and transmitted to the axial end of the enlarged diameter portion 24 via the second ring plate 43b.

Until the screw nut 30 is moved by the set distance d, the load is applied to both of the elastic member 41 and the laminated elastic member 53. After the laminated elastic member 53 and the second ring plate 43b are in contact the axial end of the enlarged diameter portion 24, the load according to the displacement of the screw nut 30 is no longer applied to the elastic member 41, and is applied only to the laminated elastic member 53.

As the elastic member 41 has a smaller modulus of elasticity than the laminated elastic member 53 and is set to an initial state in which it is in contact with the axial end of the reduced diameter portion 23, the elastic member 41 is mainly deformed until the screw nut 30 is moved by the set distance d. After the screw nut 30 is moved by the set distance d, the elastic member 41 is no longer compressed and deformed, and only the laminated elastic member 53 is additionally compressed and deformed.

That is, the displacement of the screw nut 30, while the screw nut 30 is moved by the set distance d, is distributed and transmitted to the elastic member 41 and the load transfer unit 50. Then, the additional displacement of the screw nut 30, when the screw nut 30 moves more than the set distance d, is transmitted only to the load transfer unit 50, without being transmitted to the elastic member 41, so that the load transfer unit 50 presses the piston 20.

According to the parking brake apparatus 1 according to the present disclosure having the configuration as described above, the load transfer unit 50 is kept spaced apart from the piston 20 in an axial direction or with a gap therebetween while the screw nut 30 is moved by the set distance d. When the screw nut 30 is moved by the set distance d, the load transfer unit 50 is in axial contact with the piston 20. Thereafter, the displacement of the screw nut 30, when the screw nut 30 moves more than the set distance d, is transmitted to the piston 20 through the load transfer unit 50.

Accordingly, according to the present disclosure, after the screw nut 30 is moved by the set distance d, namely, after the load transfer unit 50 is in axial contact with the piston 20, the additional displacement of the screw nut 30, when the screw nut 30 is further moved, is not transmitted to the elastic member 41 or is distributed and transmitted to the elastic member 41 and the load transfer unit 50. Therefore, the present disclosure can further reduce the load applied to the elastic member 41, compared to an example in which the load is transmitted to the piston 20 via only the elastic member 41 throughout the distance of movement of the screw nut 30. Thus, it is possible to further increase the service life of the elastic member 41.

Although the exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A parking brake apparatus comprising:
    a bolt screw rotated by a driving force transmitted from an actuator;
    one or more pistons disposed at one side or both sides of the bolt screw;
    one or more screw nuts accommodated in the piston, screwed to an end of the bolt screw, and moved along with the rotation of the bolt screw;
    one or more elastic members disposed around the screw nut within the piston, and elastically deformed, in response to a displacement of the screw nut while the screw nut is moved by a set distance, to press the piston toward a shoe; and
    a load transfer unit disposed in the piston, and configured to transmit, to the piston, a displacement of the screw nut when the screw nut moves more than the set distance, thereby pressing the piston toward the shoe, wherein:
    the load transfer unit comprises a laminated elastic member disposed around the screw nut within the piston and disposed in series with the elastic member;
    the piston comprises:
        a piston body having a receiving space in which the screw nut, the elastic member and the laminated elastic member are accommodated; and
        a rotation restraining groove recessed axially from an end of the receiving space, a polygonal end of the screw nut being slidably installed in the rotation restraining groove; and
    the receiving space comprises:
        a reduced diameter portion having a first diameter and formed to be continuous with the rotation restraining groove, a portion of the elastic member being accommodated in the reduced diameter portion; and
        an enlarged diameter portion having a second diameter larger than the first diameter and formed to be continuous with the reduced diameter portion, the laminated elastic member having a width larger than the first diameter and the other portion of the elastic member protruding by the set distance from the reduced diameter portion being accommodated in the enlarged diameter portion.

2. The parking brake apparatus according to claim 1, wherein the piston further comprises
    a stopper installation part recessed radially from an inner diameter portion of the piston body, a stopper being installed in the stopper installation part to restrain the elastic member from escaping out of the piston body.

3. The parking brake apparatus according to claim 2, wherein the stopper comprises:
    an elastic member support ring having a polygonal inner surface and outer surface, installed in the stopper installation part while protruding inwardly, and configured to support the elastic member; and
    a fixing ring installed in the stopper installation part together with the elastic member support ring, and configured to restrain movement of the elastic member support ring.

4. The parking brake apparatus according to claim 1, wherein the laminated elastic member has a greater modulus of elasticity than the elastic member.

5. The parking brake apparatus according to claim 1, wherein the screw nut comprises:

a nut body around which the elastic member and the laminated elastic member are fitted;

a bolt fastening part having a female thread thereon and formed on an inner diameter portion of the nut body, the bolt screw being screwed to the blot fastening part;

a pressure ring fastening part formed at one end of the nut body, a spring pressing part, which is in axial contact with the elastic member, being coupled to the pressure ring fastening part; and a rotation restraining part having a polygonal cross-sectional shape and formed at the other end of the nut body, the rotation restraining part being inserted into a rotation restraining groove formed in the piston.

* * * * *